Figure 1:
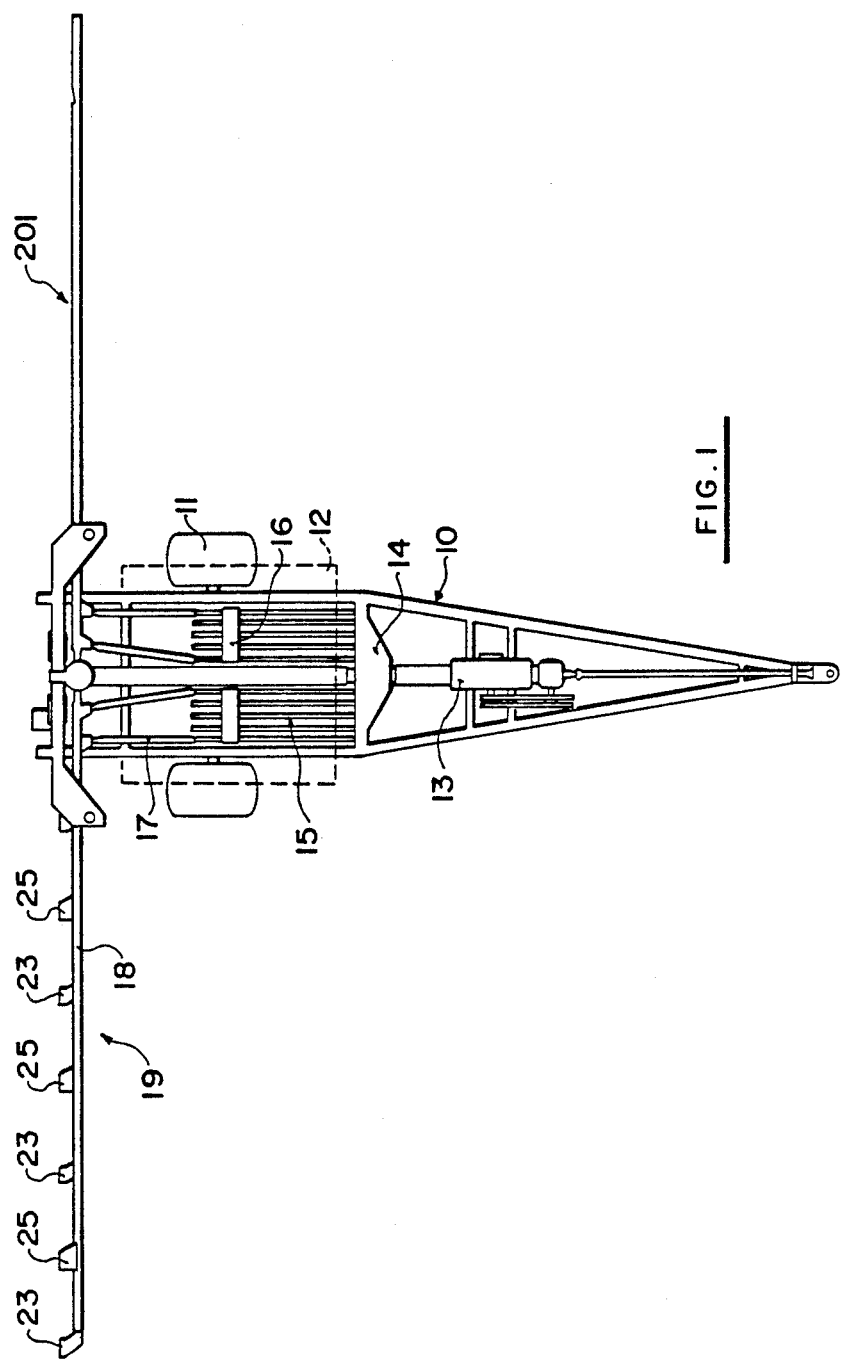
Figure 3:
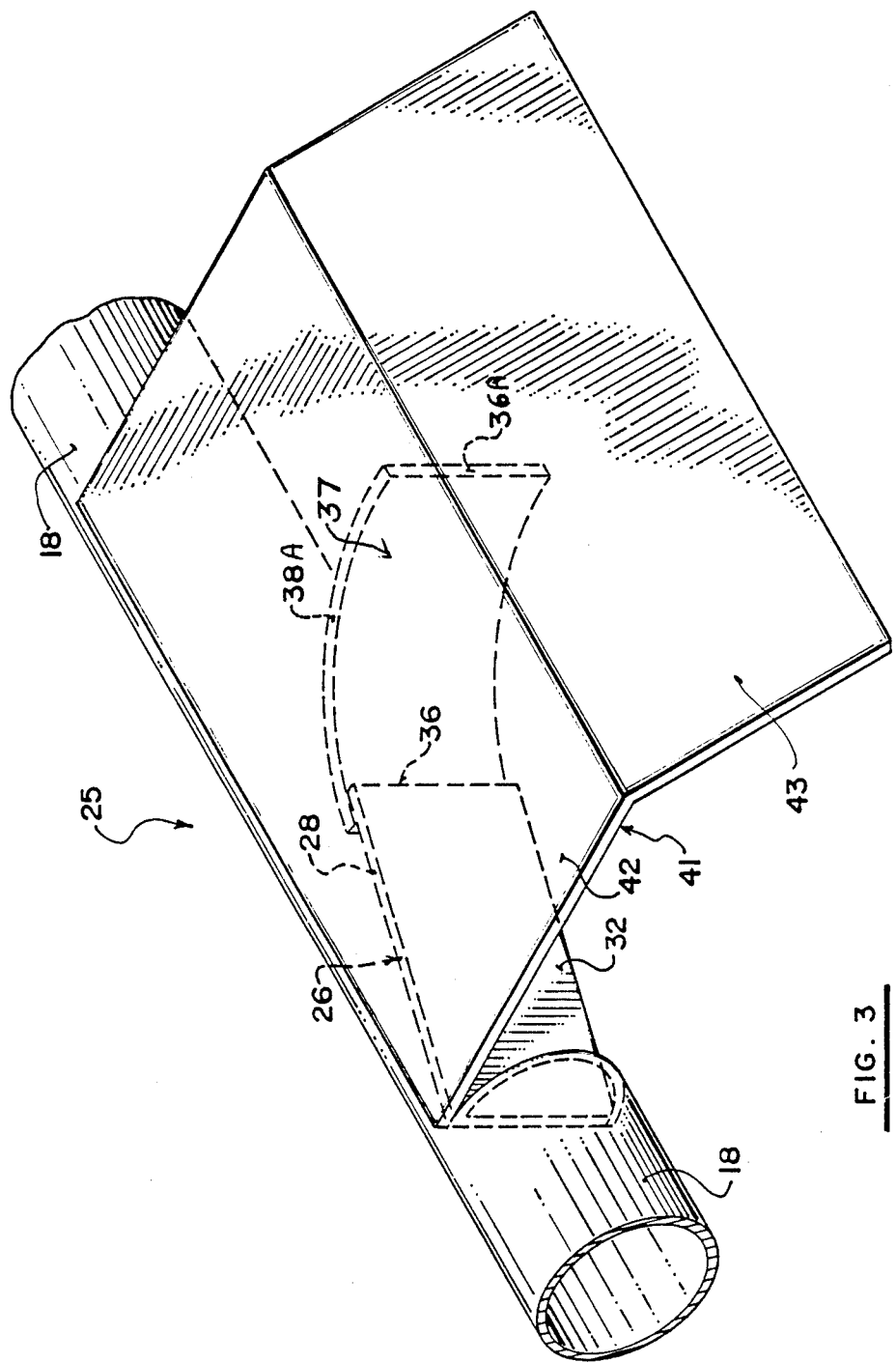

United States Patent [19]

Balmer

[11] Patent Number: 4,826,088
[45] Date of Patent: May 2, 1989

[54] PNEUMATIC DISTRIBUTION SYSTEM WITH SPLIT DUCTS

[76] Inventor: Charles Balmer, Box 34, Elie, Manitoba, Canada, R0H 0H0

[21] Appl. No.: 124,048

[22] Filed: Nov. 23, 1987

[51] Int. Cl.⁴ ............................................. A01C 15/04
[52] U.S. Cl. ..................................... 239/655; 239/523
[58] Field of Search ............... 239/654, 655, 664, 689, 239/166–168, 499–500, 502, 521, 522, 524, 565; 222/394, 400.7, 617, 630, 637

[56] References Cited

U.S. PATENT DOCUMENTS

| | | | |
|---|---|---|---|
| 2,893,741 | 7/1959 | Pilch | 239/655 |
| 4,073,439 | 2/1978 | Grataloup | 239/664 |
| 4,569,486 | 2/1986 | Balmer | 239/522 X |

FOREIGN PATENT DOCUMENTS 1039326  9/1978  Canada .
3529086  2/1987  Fed. Rep. of Germany ...... 239/655
 934960  6/1982  U.S.S.R. ............................... 239/689

Primary Examiner—Andres Kashnikow
Attorney, Agent, or Firm—Adrian D. Battison; Stanley G. Ade; Murray E. Thrift

[57] ABSTRACT

A pneumatic distribution system for particulate material includes a tank and a plurality of pipes extending outwardly from the tank to respective sides thereof. Each of the pipes forms part of the duct from a metering system and carries the particular material in an air stream to a spreader nozzle at the end of the pipe. At a position before the end of the pipe, and extraction nozzle is mounted in the pipe formed by a curved plate having a leading edge transversed to the pipe with a curved plate mounted in an opening in the pipe so as to extract the material and direct it outwardly onto a guide plate which forms a spread pattern.

7 Claims, 4 Drawing Sheets

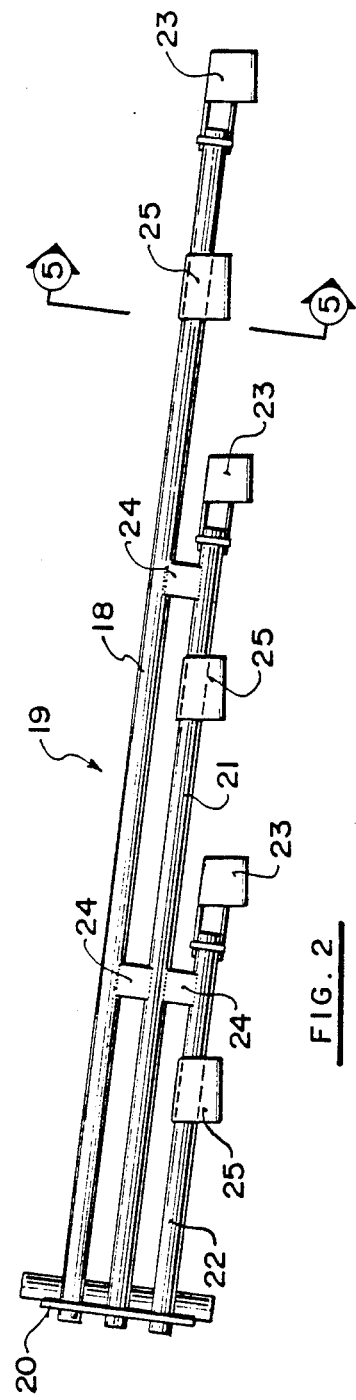
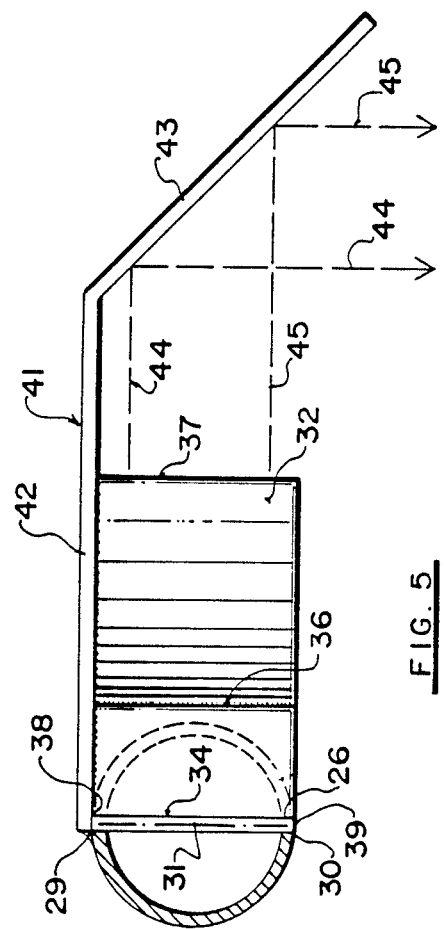
FIG. 2
FIG. 5 ial 4,826,088

PNEUMATIC DISTRIBUTION SYSTEM WITH SPLIT DUCTS

BACKGROUND OF THE INVENTION

This invention relates to a pneumatic distribution system of the type comprising a tank for containing a particulate material to be distributed, a plurality of distribution ducts, metering means for feeding the material from the tank into each of the ducts at a measured rate, an airflow system for transporting the material along the ducts, and means mounting the ducts such that the ducts extend outwardly from the tank to respective sides of the tank for spreading of the material across the ground as the tank is moved forwardly on a suitable transport mechanism.

Pneumatic distribution devices of this type are well known and are used agriculturally for distribution of seeds, fertilizer and other granular materials. One example of a device of this type is shown in U.S. Pat. No. 4,569,486 (Balmer) in which each duct includes a rigid straight tubular pipe extending outwardly from an inner end adjacent a tank to outer end of the pipe which constitutes the end of the duct. A spreader nozzle is mounted on the end of the pipe for directly receiving the material moving longitudinally of the pipe and for redirecting that material into a spread pattern which generally requires the material to be turned either forwardly or rearwardly from the pipe and then downwardly toward the ground in the spread pattern.

As the purpose of the device is to spread the material evenly across the ground, it is generally necessary to have the spreader nozzles arranged relatively closely at a spacing of the order of two to four feet. In order to produce a distribution device which has a operating width of up to 60 feet it will be appreciated that a large number of spreader nozzles is required. As each spreader nozzle thus is connected to a separate duct and each duct requires the necessary metering and air blower arrangements, it will be appreciated that increases in width of the distribution device carry a heavy financial penalty for the costs of the equipment required.

It has been appreciated that savings in cost can be achieved by providing a reduced number of ducts and then splitting the material from each duct into spreader nozzles which act at a different point across the width of the device. Thus U.S. Pat. No. 4,073,439 (Grataloup-corresponding to Canadian Pat. No. 1,039,326) discloses an arrangement in which at the end of the distribution pipe a nozzle is provided which has a first nozzle part close to the end of the pipe and a second nozzle part spaced outwardly from the end of the pipe so as to form two nozzle parts spaced across the width of the machine each supplied from the same distribution pipe. The single distribution pipe of course has to be of larger diameter to accommodate the increase in material but the increase in diameter certainly does not double the cost of the pipe and in addition only a single metering part is necessary for the single pipe and a reduced amount of air movement is necessary to transport the material through the pipe of increased diameter.

However, the nozzle device of Grataloup has not been entirely satisfactory and has not achieved significant success in the field. In particular the construction of the nozzle itself is of a complex nature and accordingly is an expensive item relative to the cost of two individual nozzles.

SUMMARY OF THE INVENTION

It is one object of the present invention, therefore, to provide an improved device for pneumatically distributing a particular material which includes a plurality of ducts of this type one or more of which is arranged to discharge the particulate material in two spray patterns spaced longitudinally of the duct.

According to the invention, therefore, there is provided a pneumatic distribution system for a particulate material comprising a tank for containing the material, a plurality of distribution ducts, metering means for feeding the material from the tank into each of the ducts at a metered rate, air blower means for pneumatically transporting the material along the ducts, means mounting the ducts such that a first set of the ducts extends from the tank outwardly to one side thereof and the second set of the ducts extends outwardly to an opposed side thereof, each set of ducts being arranged such that the extent of the ducts from the tank is staggered from a shortest one of the set to a longest one of the set, each duct including a straight continuous elongate pipe having a tubular peripheral wall and extending from an end of the pipe adjacent the tank to an end of the pipe forming the end of the duct spaced outwardly of the tank, a plurality of spreader nozzles, each nozzle being arranged at said outward end of a respective one of the pipes, each spreader nozzle including deflector surfaces for directly receiving the material from the pipe and for deflecting the material from the pipe in a spread pattern, each pipe having an opening formed in the peripheral wall thereof at a position spaced from said outward end thereof and an extractor nozzle mounted at the opening and defining a plate member having a leading edge within the pipe transverse to the pipe and dividing the pipe into two parts, a guide inclined curved across said pipe from said leading edge to one side of said pipe exteriorly of said opening such that material in one of said two parts of the pipe is deflected out of the pipe at the opening and material in the other of the two parts of the pipe continues along the pipe to said outward end thereof, and spreader means arrange to receive said material from said guide surface for forming the deflected material into a spread pattern.

According to the second aspect of the invention there is provided a pneumatic distribution system for a particulate material comprising a tank for containing the material, a plurality of distribution ducts, metering means for feeding the material from the tank into each of the ducts at a metered rate, air blower means for pneumatically transporting the metered material along the ducts, means mounting the ducts such that a first set of the ducts extends from the tank outwardly to one side thereof and the second set of the ducts extends outwardly to an opposed side thereof, each set of ducts being arranged such that the extent of the ducts from the tank is staggered from a shortest one of the set to a longest one of the set, each duct including a straight continuous elongate pipe having a tubular peripheral wall and extending from an end of the pipe adjacent the tank to an end of the pipe forming the end of the duct spaced outwardly of the tank, a plurality of spreader nozzles, each nozzle being arranged at said outward end of a respective one of the pipes, each spreader nozzle including deflector surfaces for directly receiving the material from the pipe and for deflecting the material from the pipe in a spread pattern, each pipe having an opening formed in the peripheral wall thereof and extending therearound through substantially 180° and defining side edges of the opening longitudinal of the pipe at a position spaced from said outward end thereof and a extractor nozzle mounted at the opening end defining plate means having a leading edge within the pipe diametrical to the pipe engaging said edges of the opening so as to divide the pipe into two parts, said plate means being shaped to form a guide surface having a first portion extending from said leading edge longitudinally of the pipe and inclined to the longitudinal axis thereof, a second portion extending generally outwardly from the pipe and being smoothly curved from an end of said first position such that material in one of said parts of the pipe is deflected out of the pipe at the opening and material in the other of the two parts of the pipe continues along the pipe to said outward end thereof, and spreader means arrange to receive said material from said guide surface for forming the deflected material into a spread pattern, said spreader means comprising a spreader plate having a first portion thereof lying along one side of and in contact with said plate means and the second portion thereof cranked at an angle to the first portion so as to extend across an imaginary projection of the guide surface such that material exiting from the guide surface contacts said second portion.

The use of the split duct arrangement provides significant economies in manufacture in view of the reduced number of parts and reduced air flow requirement. The arrangement in accordance with the invention provides a unique and simple construction to provide the split duct arrangement. The device is simple to manufacture and provides a high efficiency of material transported relative to air flow since it avoids seriously disturbing the air flow.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a top plan view of a pneumatic distribution device according to the invention.

FIG. 2 is a rear elevational view of one boom of the device of FIG. 1.

FIG. 3 is an isometric view of one of the diverting nozzles of one of the ducts of FIG. 2.

FIG. 4 is an underside view of the nozzle of FIG. 3.

FIG. 5 is a cross-sectional view along the lines 5—5 of FIG. 2.

In the drawings like characters of reference indicate corresponding parts in the different figures.

DETAILED DESCRIPTION

The machine of FIG. 1 comprises a frame 10 carried on ground wheels 11 and supporting a tank 12 for receiving a particulate material to be distributed. The details of the frame and tank are shown schematically as these are not of importance in this invention. In addition further details of the device as shown in Figure 1 in its general form can be obtained from U.S. Pat. No. 4,569,486 (Balmer) to which reference is made and the disclosure of which is incorporated herein by reference.

The frame carries an air pump 13 directing air to a header 14 which supplies the air flow to a plurality of ducts 15. The ducts pass through a metering system schematically indicated at 16 and including a plurality of venturis one for each duct into which the particulate material is metered for transportation through the ducts for distribution. Each duct 15 includes a duct part 17 transporting the material from the metering system to one of the pipes 18 forming the boom 19 or 201.

It will be noted that the boom 19 extends out to the left hand side of the frame as shown in FIG. 1 while the boom 201 extends out to the right hand side and each is foldable as described in the above U.S. Patent. The boom 19 is shown in elevation in FIG. 2 and it is formed by a base plate 20 to which is attached a plurality of pipes 18, 21 and 22 each forming a part of a respective one of the ducts.

Each pipe carries at its outermost end a distribution nozzle 23 of a type described in the above U.S. Pat. No. which is mounted directly on the end of the pipe and receives the particulate material in air flow from the pipe as the material and air escape from the open end of the pipe with the nozzle acting to redirect the material rearwardly of the pipe and then downwardly to the ground in a spray pattern.

As described in the above patent, each of the pipes is straight and is connected to the next adjacent pipe at a strap 24 with the straps arranged to interconnect all of the pipes at a position adjacent each end of a pipe. The pipes are inclined downwardly so that the outermost end of each of the pipes lies in a substantially horizontal plane so that the nozzles 23 are substantially equidistant from the ground. Thus each of the pipes is staggered in length so that the nozzles 23 are equidistantly spaced across the width of the whole machine.

Prior to the end of each of the pipes, there is provided an extracting nozzle generally indicated at 25 with each of the extracting nozzles arranged relative to the end of its respective pipe so that the extracting nozzle is arranged substantially equidistantly between the spreader nozzle 23 of that pipe and the spreader nozzle 23 of the next adjacent pipe. Thus the nozzles 23 and 25 are arranged equidistantly across the width of the machine in order that each can form a spread pattern with the patterns arranged relative to each other so as to provide a substantially equal distribution across the ground.

Each of the extracting nozzles is shown in detail in FIGS. 3, 4 and 5. Each comprises an opening 26 formed in the respective pipe in this case the pipe 18 with the opening 26 being formed by cutting away a wedge shaped portion 180° of the peripheral wall of the pipe between a front edge 27 of the opening which extends 180° around the pipe and a rear edge 28 of the opening and defining an upper longitudinal edge 29 of the opening and a lower longitudinal edge 30 of the opening both of which, as best shown in FIG. 5, lie in a vertical plane along the pipe inclined from the leading edge at approximately 15° to the axial plane indicated at 31.

Within the opening is welded a flat straight plate 32 which includes a vertical straight leading edge 34 which lies directly along the plane 31 so as to divide the pipe into a first portion 35 on one side of the leading edge and a second portion 35A along the other side of the leading edge with each of the portions forming one-half of the pipe area and shaped as a semi-circle.

The plate 32 extends from the leading edge in an inclined direction at the above angle of 15° outwardly to and just beyond the side wall of the pipe.

A rearward portion 36 of the plate 32 extends outwardly to one side of the pipe forming a recess between the rearward portion 36 and the pipe. Into that recess projects a further plate 37 which is curved smoothly out to a position extending generally at right angles to the pipe. Both the leading portion 34 of the plate 32 and the leading edge of the plate 37 are straight that is the plates are flat in a direction transverse to their length and continue flat throughout their full length.

Figure 4:
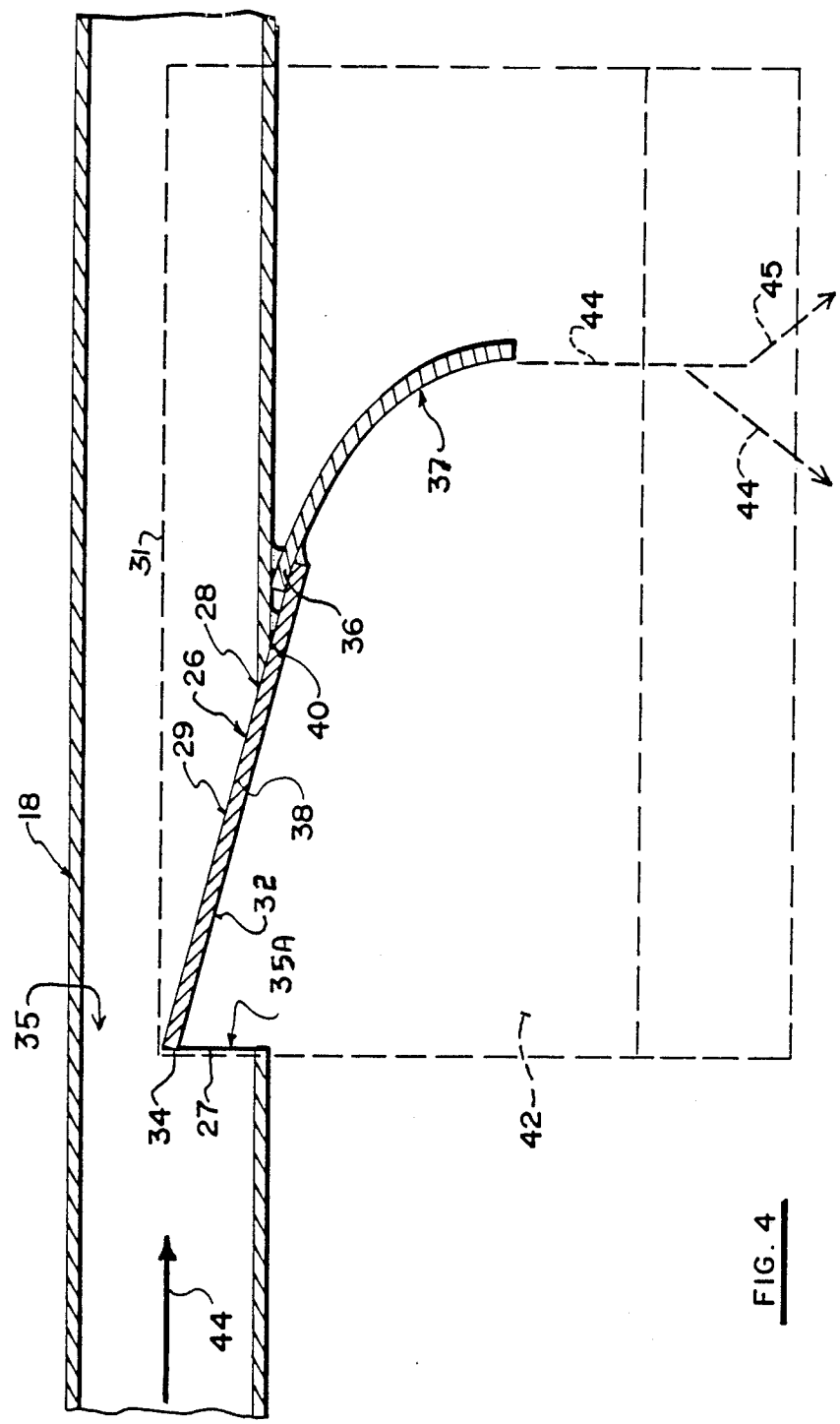

An upper edge 38A of the plate 32 is welded to the edge 29 of the opening either with a continuous weld or with spot welds to hold the plate in the required position and to retain its forward portion axial of the pipe and the leading edge at the required diametrical position. In addition a lower edge 39 of the plate is similarly welded to the lower edge 30 of the opening 26. A rear face indicated at 40 of the plate is welded to the peripheral wall of the pipe 18 at the intersection between the peripheral wall and the trailing edge 28 of the opening and the front and rear faces of the plate 37 are similarly welded 26. This holds the plate 37 in its required position relative to the pipe and through its proper curvature to a position extending outwardly at right angles to the pipe as shown best in FIG. 4.

A guide plate 41 is welded across the top of the pipe 18 and across a top edge 38A of the plate 37 so as to cover the opening and to extend beyond the opening in the rearward direction. The cover plate includes a first plate portion 42 which lies in the plane of the upper edge 38A of the plate member 37 and a downwardly canted portion 43 which is arranged at a angle of the order of 45° to the upper portion 42 and extending across the plate 37 at a position spaced from the trailing edge 36A thereof.

In another arrangement, the cover plate and the plate portion 37 are formed as an integral unit separate from the pipe and strapped thereto by a surrounding strap.

In operation material carried in the pipe 18 from the upstream end moves in the direction of the arrow 44 with the material evenly spread across the cross-sectional area of the pipe. At the leading edge 34, the material is divided into two parts in proportions directly equal to the division of the cross-sectional area that is into two equal parts with one part of the material and the entraining air moving along the inner face of the plate 32 and the other part moving along the rear face of the plate 32. The part on the inner face is thus contacted by the plate 32 and redirected thereby so as to emerge from the trailing edge 36A of the plate 37 as a vertical line of the material moving in a direction generally at right angles to the pipe. This line of material leaves the contact of the guide plate 37 and flies freely across the space to the canted portion 43 of the guide plate at which it impinges on the canted portion and rebounds downwardly toward the ground in a spread pattern. It has been noted that the material forms a spread pattern having a transverse width despite the fact that all of the line of material emerging in a vertical plane has the same angle of contact with the canted plate portion 43. Thus material on a path at the upper edge of the trailing edge 36A as shown in the dotted line indicated at 44 tends to move in a leftwardly direction on engaging the upper part of the portion 43 while the material leaving the lower part of the trailing edge 36A hits the portion 43 at a lower point and tends to move toward the right.

This phenomenon is believed to arise as a result of the differential in air expansion between the upper part of the plate 43 and the lower part of the plate 43.

The nozzle thus acts to extract one-half of the material transported in the pipe 18 and to form it into a spread pattern as indicated at 44 and 45.

The other half of the material in the portion indicated at 35 of the pipe continues along the pipe past the extraction nozzle to the spreader nozzle 23 directly at the end of the pipe. The construction of the spreader nozzle 23 is of a similar nature to that of the extraction nozzle 25 and is shown in detail in the aforementioned U.S. Patent.

In some cases it is necessary to provide a dividing plate along the length of the pipe 18 from the leading edge 34 and lying along the diametrical plane of the leading edge 34 and extending to the spreader nozzle 23 so as to avoid expansion of air within the pipe behind the extraction nozzle which can cause a slowing of the movement of the material within the pipe and thus a different spread pattern at the nozzle 23.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A pneumatic distribution system for a particulate material comprising a tank for containing the material, a plurality of distribution ducts, metering means for feeding the material from the tank into each of the ducts at a metered rate, air blower means for pneumatically transporting the metered material along the ducts, means mounting the ducts such that a first set of the ducts extends from the tank outwardly to one side thereof and a second set of the ducts extends outwardly to an opposed side thereof, each set of ducts being arranged such that the extent of the ducts from the tank is staggered from a shortest one of the set to a longest one of the set, each duct including a straight continuous elongate pipe having a tubular peripheral wall and extending from an end of the pipe adjacent the tank to an end of the pipe forming the end of the duct spaced outwardly of the tank, a plurality of spreader nozzles, each nozzle being separate from and attached to said outward end of a respective one of the pipes, each spreader nozzle including deflector surfaces for directly receiving the material from the pipe and for deflecting the material from the pipe in a spread pattern, each pipe having an opening formed in the peripheral wall thereof at a position spaced from said outward end thereof and a extractor nozzle mounted at the opening and defining guide surface means having a straight substantially vertical leading edge within the pipe transverse to the pipe and dividing the pipe into two parts and being inclined across said pipe from said leading edge to one side of said pipe exteriorly of said opening such that material in one of said two parts of the pipe is deflected out of the pipe at the opening and material in the other of the two parts of the pipe continues along the pipe to said outward end thereof, and spreader means arranged to receive said material from said guide surface means for forming the deflected material into a spread pattern, the extractor nozzle of each pipe being positioned between the spreader nozzle of that pipe and the spreader nozzle of the next adjacent shorter pipe.

2. The invention according to claim 1 wherein said leading edge is arranged to divide the pipe into said two parts which are of equal cross-sectional area and wherein said opening is arranged in said pipe at a position along the length thereof such that said spreader means is positioned equidistantly between said spreader nozzle of the respective pipe and the spreader nozzle of the next adjacent shorter duct.

3. The invention according to claim 1 wherein said guide surface means comprises a first plate member which extends from a forward end thereof within the pipe to a rearward end thereof outside of the pipe and a second plate member extending from a forward end behind said rearward end of said first plate member to a rearward end substantially at right angles to the pipe outwardly of said opening.

4. The invention according to claim 3 wherein each of said plate members is shaped such that at all positions along its length its surface, in a direction transverse to its length at that position, lies in a straight line.

5. The invention according to claim 3 wherein each of the plate members has a width equal to the diameter of the pipe.

6. The invention according to claim 1 wherein said spreader means comprises a spreader plate having a first portion thereof lying along one side of and in contact with said guide surface and a second portion thereof bent at an angle to the first portion so as to extend across an imaginary projection of the guide surface such that material exiting from the guide surface contacts said second portion.

7. A pneumatic distribution system for a particulate material comprising a tank for containing the material, a plurality of distribution ducts, metering means for feeding the material from the tank into each of the ducts at a metered rate, air blower means for pneumatically transporting the metered material along the ducts, means mounting the ducts such that a first set of the ducts extends from the tank outwardly to one side thereof and a second set of the ducts extends outwardly to an opposed side thereof, each set of ducts being arranged such that the extent of the ducts from the tank is staggered from a shortest one of the set to a longest one of the set, each duct including a straight continuous elongate pipe having a tubular peripheral wall and extending from an end of the pipe adjacent the tank to an end of the pipe forming the end of the duct spaced outwardly of the tank, a plurality of spreader nozzles, each nozzle being separate from and attached to said outward end of a respective one of the pipes, each spreader nozzle including deflector surfaces for directly receiving the material from the pipe and for deflecting the material from the pipe in a spread pattern, each pipe having an opening formed in the peripheral wall thereof and extending therearound through substantially 180° and defining side edges of the opening longitudinal of the pipe at a position spaced from said outward end thereof and an extractor nozzle mounted at the opening and defining plate means having a straight leading edge within the pipe diametrical to the pipe engaging said edges of the opening so as to divide the pipe into two parts, said plate means being shaped to form a guide surface having a first portion extending from said leading edge longitudinally of the pipe and inclined to the longitudinal axis thereof, a second portion extending generally outwardly from the pipe and being smoothly curved from an end of said first portion such that material in one of said parts of the pipe is deflected out of the pipe at the opening and material in the other of the two parts of the pipe continues along the pipe to said outward end thereof, and spreader means arrange to receive said material from said guide surface for forming the deflected material into a spread pattern, said spreader means comprising a spreader plate having a first portion thereof lying along one side of and in contact with said plate means and a second portion thereof bent at an angle to the first portion so as to extend across an imaginary projection of the guide surface such that material exiting from the guide surface contacts said second portion.

* * * * *